United States Patent [19]

Cook

[11] Patent Number: 4,593,810

[45] Date of Patent: Jun. 10, 1986

[54] MECHANICAL HANDLING APPARATUS

[75] Inventor: Kenneth Cook, Anglesey, United Kingdom

[73] Assignee: Hydraroll Limited, United Kingdom

[21] Appl. No.: 502,015

[22] PCT Filed: Aug. 27, 1982

[86] PCT No.: PCT/GB82/00259

§ 371 Date: Apr. 21, 1983

§ 102(e) Date: Apr. 21, 1983

[87] PCT Pub. No.: WO83/00680

PCT Pub. Date: Mar. 3, 1983

[30] Foreign Application Priority Data

Aug. 27, 1981 [GB] United Kingdom ................ 8126132

[51] Int. Cl.[4] .................... B60P 1/52; B65G 13/02
[52] U.S. Cl. ..................... 198/781; 198/721; 198/722; 198/782; 414/535
[58] Field of Search ................ 414/529, 532, 535; 193/35 SS; 198/460, 781, 782, 721, 722

[56] References Cited

U.S. PATENT DOCUMENTS

| | | | |
|---|---|---|---|
| 2,453,401 | 11/1948 | Beeching | 198/782 |
| 3,011,665 | 12/1961 | Wise | 414/535 |
| 3,447,665 | 6/1969 | Egeland et al. | 414/534 X |
| 3,563,721 | 2/1971 | Ritter, Jr. | 198/781 X |
| 3,613,852 | 10/1971 | Schwarzbeck | 198/782 |
| 3,690,440 | 9/1972 | Macpherson | 198/782 |
| 3,724,642 | 4/1973 | Degood | 198/781 |
| 3,737,022 | 6/1973 | Deneefe et al. | 198/782 |
| 3,899,070 | 8/1975 | Lang | 198/782 |
| 4,044,876 | 8/1977 | Hammond | 193/35 SS |
| 4,077,532 | 3/1978 | Bryan | 198/782 |
| 4,089,399 | 5/1978 | Webb | 414/529 X |
| 4,258,766 | 3/1981 | Van Dijk | 193/35 SS |
| 4,273,239 | 6/1981 | Thwaites et al. | 198/781 |
| 4,306,830 | 12/1981 | Le Duc | 414/529 X |
| 4,331,228 | 5/1982 | Galarowic | 198/781 X |
| 4,473,149 | 9/1984 | Vogt et al. | 198/781 |

FOREIGN PATENT DOCUMENTS

| | | |
|---|---|---|
| 0002106 | 5/1979 | European Pat. Off. |
| 124416 | 9/1979 | Japan .................. 414/532 |
| 120181 | 9/1979 | Japan .................. 414/535 |

Primary Examiner—Robert J. Spar
Assistant Examiner—Stuart J. Millman
Attorney, Agent, or Firm—Shapiro and Shapiro

[57] ABSTRACT

Mechanical handling apparatus (1) which includes rollers (7) which can be raised and lowered above or below a support surface, and a driven roller or rollers (14) which is driven by an electro-hydraulic system including a hydraulic motor (20) and which is mounted on a pivoted bracket (15) which can be raised and lowered by an air control ram (16) so that the roller (14) too can be raised and lowered relative to the support surface to engage a pallet (18) and drive that pallet (18) over the apparatus (1).

5 Claims, 3 Drawing Figures

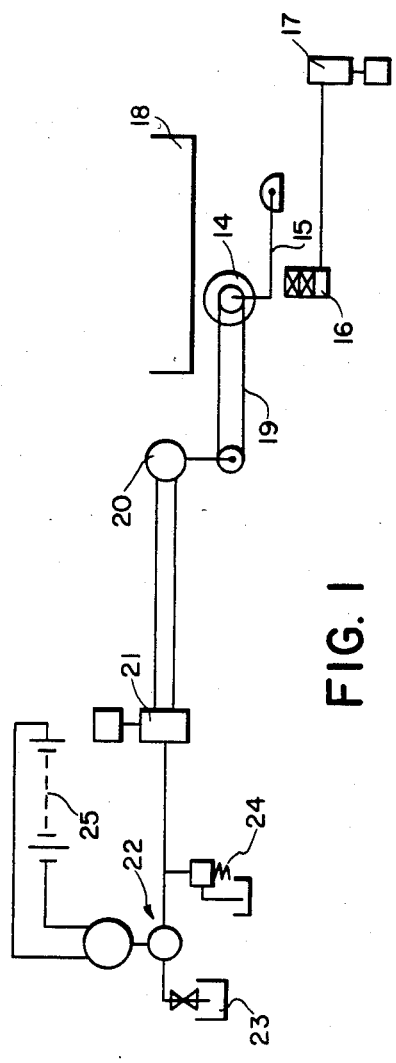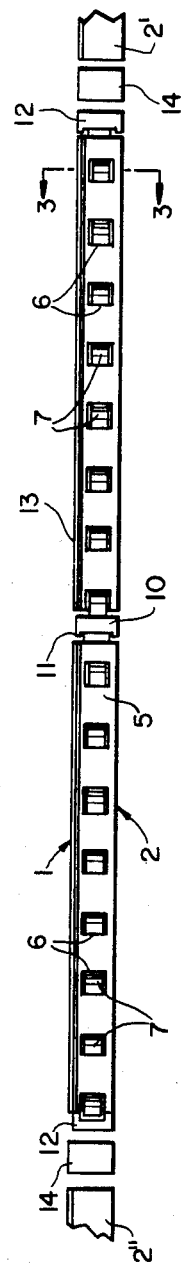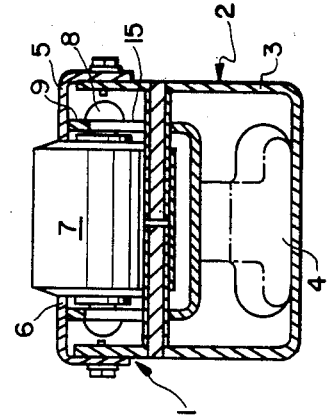
FIG. 1
FIG. 2
FIG. 3

MECHANICAL HANDLING APPARATUS

TECHNICAL FIELD OF THE INVENTION

The invention relates to mechanical handling apparatus.

BACKGROUND ART

Conveyors such as roller tracks which can be raised above or lowered below a floor or other substratum are often mounted in positions which are relatively inaccessible, for example in a 40' container vehicle. It is often difficult to manhandle a load along the full length of the track in such circumstances.

SUMMARY OF THE INVENTION

It is an object of the invention to seek to mitigate the disadvantages of prior apparatus.

According to one aspect of the invention there is provided mechanical handling apparatus, comprising a conveyor, a separate drive means, power means to drive the separate drive means, and a device mounting the separate drive means so that that means can be raised and lowered with respect to a surface for loads in which the apparatus is mounted for movement of loads over the surface when the power means is actuated.

According to a second aspect of the invention there is provided mechanical handling apparatus, comprising a conveyor in which rotatable means are supported by inflatable means so that, when such means is inflated parts of the rollers stand above a support surface and render any load thereon mobile whereas when the means is deflated the rollers are retracted so that the load is immobile on the support surface, a separate drive means associated with the conveyor, power means to drive the separate drive means, and a device mounting the separate drive means so that that means can be raised and lowered with respect to the support surface whereby when raised the separate drive means can contact and move a load over the conveyor and when lowered the separate drive roller is retracted out of contact with a load.

According to a third aspect of the invention there is provided a support surface for loads such as a floor of a vehicle, including a mechanical handling apparatus as hereinbefore defined.

There may be a plurality of separate drive means spaced apart along the conveyor. This construction provides for a continuity of powered drive from separate drive, rotatable, means along the conveyor.

The device mounting the or each separate drive means may comprise a pivoted mounting such as a bracket. This construction provides a relatively simple means of mounting the or each separate drive means for movement relative to the support surface.

The pivoted bracket may be coupled to a fluid-operated device to effect raising and lowering, the said device suitably comprising an air ram, an air inflatable bag, or a hydraulic ram.

Mechanical handling apparatus embodying the invention is hereinafter described, by way of example, with reference to the accompanying drawings.

BRIEF DESCRIPTION OF THE DRAWINGS

FIG. 1 is a schematic circuit arrangement showing mechanical handling apparatus embodying the invention;

FIG. 2 is a plan view of mechanical handling apparatus embodying the invention; and FIG. 3 is an enlarged cross-sectional view on the line 3—3 of FIG. 2.

Referring to the drawings, the mechanical handling apparatus 1 shown has a hollow elongate body member 2 in the form of a channel member 3 which houses an inflatable device in the form of an air bag assembly 4 which has connectors (not shown) for connecting it to an existing air supply of a vehicle for example. The mechanical handling apparatus 1 thus forms a track.

The open top of the channel member 3 is closed by a static support surface in the form of a top plate 5 (as viewed in FIG. 3) which has a number of discrete openings 6. A roller 7 is aligned in the vertical sense, with each opening 6. The rollers 7 are freely rotatable and are mounted by means 8 such as a shaft and retainer nuts in a mounting in the form of a channel shaped support 9 the underside of which is in contact with the air bag assembly 4.

The clearance of the rollers 7 and their associated openings 6 is such that substantially no foreign bodies can enter the channel member. Under the support 9 and above the air bag 4 there is a flat plate (not shown) covering the width of the inside of the body member 2 to protect the air bag from foreign bodies which might possibly enter into the inside section.

The apparatus 1 has stop means in the form of a plate 10 intermediate its length and independent of the air bag assembly 4. The stop plate 10 comprises a flat plate which can be moved manually from one position to another position in which it is supported in a slot 11 in the body member 2. There is a slot 11 at either side of the device, see FIG. 2.

There is a stop plate 12 at each end of the body member 2.

The stop plate 10 is between two rollers 7 so that in the inoperative position shown in FIG. 2, one edge lies close to one of the rollers.

There is a longitudinally extending guide plate 13 (FIG. 2) secured to one side of the apparatus 1 (though this guide plate can, it will be understood, be dispensed with).

The apparatus 1 also includes a separate drive means in the form of a driven roller 14. There is in the embodiment shown a driven roller at the end of each conveyor section or elongate body member 2, in other words there is a driven roller 14 between adjacent elongate members 2, 2' and 2" as shown in FIG. 2. A complete conveyor track then comprises a plurality of members 2, 2' and 2" laid end to end with a driven roller 14 between the members. The spacing of the driven rollers 14 is selected to match pallet lengths, it will be understood. There is also a driven roller 14 at the ends (not shown) of the track. Each driven roller 14 is pivotably mounted by a device comprising a pivoted mounting or bracket 15 which allows the driven roller 14 to be raised and lowered with respect to top plate 5. This transverse movement with respect to the top plate 5 is effected by coupling the pivoted bracket 15 by a fluid operated device in the form of an air ram 16 (with control valve 17) for controlling this movement. The driven roller 14 is driven to drive a load in the form of for example a pallet 18 over the apparatus 1 by power means in the form of a transmission chain 19, hydraulic motor 20, control valve 21, motor/pump 22 with filter 23 and relief valve 24 and a battery 25.

The track is installed in situations where loads are to be handled, for example in a container trailer, ship or aircraft hold. The tracks 1 are generally laid in parallel in pairs along the length of say a vehicle at lateral spacings adequate to support a load-carrying pallet 18. The air bag assemblies 4 and the air ram 16 are connected to a suitable respective pneumatic source, which could be the air supply system of the vehicle (not shown).

In order to move a pallet 18 into the vehicle, the air bag 4 is inflated so that the rollers 7 protrude above the plane of the top plate 5, which is substantially flush with the floor of the vehicle which forms the support surface for the pallet 18. The air control ram 16 is also activated to pivot the bracket 15 and raise the driven roller 14 above the support surface too. The motor 20 is actuated to rotate the rollers 14 and so drive a pallet 18 along the track, the spacing between the rollers 14, one pallet length, being such as to ensure that the pallet 18 is continuously fed along the tracks 1.

When the pallet 18 is in the desired position, the roller 14 rotation is ceased, the bracket 15 is pivoted downwardly (as considered in FIG. 1) and the air bags 4 are deflated so that the "live" tracks became "dead". The stop plates 12 can be flipped up manually, out of the plane of the top plate 5, to help keep a pallet in position.

In order to unload the vehicle, the stop plates 12 are returned to the horizontal position, the air bags 4 are inflated to raise the pallet off the support surface, and the pivotable bracket 15 is raised in order to raise the drive roller(s) 14 so that it (they) too can engage the pallet 18. The motor 20 is then operated in the reverse mode to rotate the roller(s) 14 in the opposite sense to that for loading, and the pallet 18 is driven along the tracks 1 to the exit from the vehicle, where it can be received by another conveyor system such as the kind often used at airports, or by a fork-lift truck. The provision of the drive roller(s) 14 on a pivotable bracket 15 ensures that the roller(s) 14 can freewheel when not in contact with a pallet and also the freewheel provision in the embodiment shown avoids the difficulty in matching the speed of the roller(s) 14 to the speed of an external conveyor. This is achieved in that the surface of the roller(s) moves in an arc when it is raised and lowered. Also, the lowering of the roller(s) 14 ensures that the usual operation of the rollers 7 on raising and lowering of the air bags 4 can be achieved. Further, an adequate drive of the pallet 18 is achieved with limitation of the driven roller thrust vertically and this avoids damage to a pallet and the requirement for excessively strong mountings for the bracket 14 and excessively powerful power means for driving the roller(s) 14.

It will be understood that the mechanical handling apparatus 1 above described and shown in the drawings can be modified. For example, the stop plates 10 although shown can, and usually will, be dispensed with entirely. Also, the driven rollers 14 can be placed between parallel tracks 1 or alongside a track 1 rather than along the length thereof. Alternatively, a driven roller 14 can be incorporated in the elongate body channel member 2. The power means shown is an electrohydraulic drive, but this could be replaced by a geared electric motor. The air ram 16 for controlling raising and lowering of the roller 14 can be replaced by an inflatable air bar or an hydraulic ram. The driven roller 14 can also be directly driven by the hydraulic motor instead of through the transmission chain 19, which is then dispensed with. The air control ram or bag could also be driven from the same source as that for the air bags 4 by suitable modification. Also, where several rollers 14 are used, they could all be driven by a single power means and selected ones could also be raised and lowered by a common air ram, air bag or hydraulic ram.

It will also be understood that the expression drive means used herein refers to both a roller as shown and described, and a rotatable device such as a chain, strand or belt which is endless and is trained around two or more rotatable members such as rollers, sprockets, wheels, pulleys or the like one or more of which is driven and with which the chain or, strand or belt moves. In every embodiment, the roller(s) 14 or endless chain, strand or belt can "slip" under a load such as a pallet once that pallet is stopped from further movement by abutment against a stop such as a stop plate 10 or another pallet. The motor 20 can thus continue to drive the drive means for the load such as a pallet until the container vehicle is filled to the required amount. This saves on turnaround time and loading/unloading time.

The top plate 5 may it will be understood be flat rather than of channel section as shown, though the illustrated channel section 5 is preferred as it is stronger. In either case the plate 5 is readily removable for replacement or maintanance while the track is still mounted on a vehicle or other floor.

I claim:

1. Mechanical handling apparatus for the movement of loads over a support surface comprising a conveyor which includes freely rotatable means and inflatable means for supporting said rotatable means, said rotatable means and supporting means being positioned relative to said support surface so that said supporting means may be inflated to raise portions of said rotatable means above said support surface for rendering a load mobile on that surface and so that said supporting means may be deflated to retract said portions beneath said support surface for rendering said load immobile, the handling apparatus further comprising load drive means spaced from said rotatable means, said load drive means having surface means engageable with said load for moving said load along said conveyor and cooperable with said load for slipping relative to said load when said load, while drivingly engaged by said surface means, encounters an obstacle which prevents movement of the load along the conveyor; power means for driving said load drive means; and means independent of said inflatable means for raising said load drive means independently of said rotatable means relative to said support surface to bring said surface means of said load drive means into driving engagement with said load and for lowering said load drive means independently of said rotatable means relative to said support surface to retract said surface means of said load drive means out of driving engagement with said load.

2. Mechanical handling apparatus as defined in claim 1, wherein there is a plurality of separate load drive means spaced apart along the conveyor.

3. Mechanical handling apparatus as defined in claim 2, wherein each of said separate drive means comprises a roller which can be rotated by the power means.

4. Mechanical handling apparatus as defined in claim 1, wherein said raising and lowering means comprises a pivoted mounting.

5. Mechanical handling apparatus as defined in claim 4, wherein the pivoted mounting includes a bracket coupled to a fluid-operated device to effect raising and lowering of said load drive means.

* * * * *